United States Patent [19]
Clemmer

[11] Patent Number: 6,158,475
[45] Date of Patent: Dec. 12, 2000

[54] UNDERGROUND PIPE SUPPORT

[76] Inventor: David Grant Clemmer, 5208 Rembert Dr., Raleigh, N.C. 27612

[21] Appl. No.: 09/472,586

[22] Filed: Dec. 27, 1999

Related U.S. Application Data

[63] Continuation-in-part of application No. 09/262,276, Mar. 4, 1999, abandoned.

[51] Int. Cl.[7] ........................................................ F16L 9/18
[52] U.S. Cl. ............................ 138/112; 138/113; 138/108
[58] Field of Search ..................................... 138/112, 113, 138/114, 108, 157–159

[56] References Cited

U.S. PATENT DOCUMENTS

| | | | |
|---|---|---|---|
| 2,325,616 | 8/1943 | Landweber | 138/112 X |
| 3,502,112 | 3/1970 | Hankila | 138/99 |
| 4,182,378 | 1/1980 | Dieter | 138/112 |
| 4,710,404 | 12/1987 | Reichert et al. | 427/386 |
| 4,796,670 | 1/1989 | Russell et al. | 138/108 X |
| 4,896,701 | 1/1990 | Young | 138/108 |
| 5,404,914 | 4/1995 | Ziu | 138/113 |
| 5,441,082 | 8/1995 | Eskew et al. | 138/112 |
| 5,496,134 | 3/1996 | Goehner | 138/114 X |
| 5,500,064 | 3/1996 | Schinabeck | 138/98 X |
| 5,592,975 | 1/1997 | Wissman et al. | 138/112 |
| 5,692,544 | 12/1997 | Friedrich et al. | 138/99 |
| 5,743,302 | 4/1998 | McNeely | 138/113 |

*Primary Examiner*—Patrick Brinson
*Attorney, Agent, or Firm*—Mills Law Firm

[57] ABSTRACT

An improved pipe support device for supporting an underground carrier pipe within an outer encasement of a horizontally bored hole beneath a highway or railroad bed is disclosed. The pipe support is an annular ring structure comprised of two semicircular clamping members, which each terminate in an outwardly extending flange. The opposite ends of each semicircular clamp section are joined by a hinge extending across the juncture thereof to provide pivoting movement from an open condition to a closed condition of the pipe support. The opposed flanges can be drawn together by attaching hardware to secure the pipe support to the underground carrier pipe. A plurality of radially extending leg members are provided around the circumference of the pipe support which terminate in elongated skid members each having tip portions being inwardly inclined toward the longitudinal axis of the pipe support to facilitate insertion of the carrier pipe within the casing of the horizontally bored hole.

10 Claims, 3 Drawing Sheets

UNDERGROUND PIPE SUPPORT

CROSS REFERENCE TO RELATED APPLICATION

This application is a continuation-in-part application of U.S. Ser. No. 09/262,276, filed on Mar. 4, 1999, now abandoned in the name of David G. Clemmer and entitled "Underground Pipe Support".

FIELD OF INVENTION

The present invention is generally related to underground pipe supports and, more particularly, to a device for supporting and spacing an underground carrier pipe within an outer tubular casing in underground applications usually under highways and railroads.

BACKGROUND OF THE INVENTION

During the installation of underground pipe lines, it is the conventional practice to position a carrier pipe conducting gasoline, oil, sewage, etc. within an outer tubular casing to protect the carrier pipe from damage. In some instances it is also necessary to electrically insulate the carrier pipe from the outer casing to prevent corrosion.

Such casing spacers and pipe supports are known in the prior art, but each has inherent disadvantages. For example, U.S. Pat. No. 5,441,082 discloses a casing spacer for use in supporting underground pipes within a horizontally disposed outer casing. This device is comprised of two steel shell members having a semicircular cross-section for engaging and enclosing a carrier pipe within an outer casing. Attached to the outer surface to each of the first and second shell members are one or more adjustable risers for engaging an inner surface of the outer casing so as to maintain the pipe in a centered position within the casing. Each riser includes a runner constructed of a plastic material to facilitate positioning of the device within the casing. The casing spacer's first and second shell members are securely coupled together by way of a flange with suitable attaching hardware along one edge and a hook and eye arrangement along the second, opposite edge.

A disadvantage of this device is that when secured to an underground pipe within an outer casing, the vertical spacing of the pipe within the encasement will decrease if the support and spacing device is caused to rotate within the encasement causing stress on the pipe joints and possible leakage.

Another example of a prior art pipe support and spacer is disclosed in U.S. Pat. No. 4,896,701, which discloses a device for supporting an underground pipe or cable within the outer encasement sleeve of a horizontally bored hole. The support device includes a round collar having two resiliently spaced-apart ends which can be urged together to secure the device to the underground pipe or cable. A plurality of equidistantly spaced-apart and outwardly extending support legs are provided around the circumference of the collar which terminate in an elongate foot having opposing ends inclined inwardly toward the collar. Each foot extends generally parallel to the longitudinal axis of the collar and has a greater length than the longitudinal length of the collar to facilitate placement and support of an underground pipe or conduit within the encasement sleeve of the underground hole.

However, the structure of this device requires that the support be slipped over the outside diameter of the inner pipe from one end only and slid along the pipe to the desired support position, which requires a cumbersome installation process.

Thus, the pipe support of the present invention has been developed to solve these problems and other shortcomings of the prior art exemplified below.

U.S. Pat. No. 5,441,082 to Eskew et al. discloses a casing spacer including first and second elongated steel shell members comprised of stainless steel or high strength steel with corrosion inhibiting coating with each shell member having a semicircular cross section for engaging and enclosing a carrier pipe within an outer casing. The casing spacer's first and second shell members are securely coupled together by way of flange and nut and bolt combinations along one edge and a hook and eye arrangement along a second, opposite edge.

U.S. Pat. No. 4,896,701 to Young discloses an underground pipe support and spacer for supporting an underground pipe or cable within an outer casing sleeve of a horizontally bored hole. This support device includes a round collar having two resiliently spaced-apart ends which can be urged together to secure the device to the underground pipe or cable.

U.S. Pat. No. 5,404,914 to Ziu discloses a centering support for a double contained pipe assembly of an inner pipe located within an outer pipe. This centering support has a first half defining a first surface substantially conforming to the outer surface of the inner pipe and a second half defining a second surface substantially conforming to the outer surface of the inner pipe. The first and second surfaces are seated on the outside surface of the inner pipe and the first and second halves are coupled together by at least one fastening member for coupling the centering support to the inner pipe.

U.S. Pat. No. 4,182,378 to Dieter discloses a spacing element for spacing an inner pipe from an outer pipe. This device has an annular body including a plurality of segments adapted to be placed on an outer surface of the pipe and each having a plurality of projections providing with sliding surfaces and adapted to abut against the protective pipe. This spacing element further includes a plurality of electrically insulating wedge-shaped connecting portions for connecting the segments with one another. Additional connecting members such as electrically insulating pins, straps, and strings may be provided for connecting the segments with one another.

U.S. Pat. No. 5,592,975 to Wissmann, et al. discloses a glide tube ring for tube-in-tube systems, pipe conduits and the like. The glide ring tube according to the invention is provided with axially spaced glides running parallel to each other whose material has the lowest possible friction coefficient, especially a plastic, preferably a fiberglass-reinforced polyethylene, polyamide or the like. The glide tube ring is attached to the central tube forming a closed ring that centers this tube in the outer protecting tube.

Finally, U.S. Pat. No. 5,496,134 to Goehner discloses a sliding skid ring from the pipe member to be laid underground inside a jacket pipe consisting of least two segments connected to each other by tightening elements and held under pretention against the pipe member in a non-positive manner. The sliding skid ring is comprised of several identical segments. Each segment is provided on one side with a radial section in the form of one or more tabs and, on the opposite side, with another radial section in the form of a closure part having one or more insertion slots designated to accept the tabs.

SUMMARY OF THE INVENTION

After studying the shortcomings of the prior art devices, the present invention has been developed to provide an improved pipe support for supporting an underground pipe disposed within a tubular casing extending through a hole bored horizontally beneath a highway, railroad bed, etc. The present pipe support includes an annular ring member comprised of a pair of semicircular clamp sections, which each terminate in an outwardly projecting flange.

The two semicircular sections each span less than 1800 such that in assembly for nominally sized pipes, the flanges are circumferentially spaced permitting the assembly to handle a plurality of pipe types and sizes. The sections are circumferentially spaced at the other ends and pivotally connected a surface-mounted, butt hinge. The ends of the sections are planar permitting secure attachment by continuous weldment along the edges of the hinge. Thus, the two semicircular sections pivot apart about the hinge so as to be clamped about the outside diameter of the inside pipe.

Suitable attaching hardware such as nut and bolt connections between the flanges can be tightened in order to draw the flanges into close proximity to secure the present pipe support around the inner carrier pipe.

A plurality of radially projecting, spaced-apart leg members are fixedly attached about the circumference of the present pipe support and each leg member has an elongated skid fixedly attached to the outer end thereof which extends in generally parallel relation to the longitudinal axis of the pipe support. The opposite ends of the runner on each of the leg members is inclined toward the longitudinal axis of the pipe support to facilitate insertion of the carrier pipe into the outer casing within a horizontally bored hole. The leg member is fully attached coextensive with the skid and the ends to reinforce the skid during insertion and to avoid bending or deformation of the ends if directly impacted during moving.

In order to facilitate deviations in the axis of the outer casing, the clamp may be supplied in kit form with the runners having extended legs. After determination of the axial position necessary to make adjacent section coaxial, the leg members are field cut and welded to the clamps sections. Accordingly, significant installation variations in casing placement may be accommodated while retaining the ease of assembly and diametrical versatility of the hinged clamp design.

In view of the above, it is an object of the present invention to provide an improved pipe support for supporting an underground carrier pipe within an outer casing lining a horizontally bored hole.

Another object of the present invention is to provide a pipe support for supporting an underground carrier pipe which is simpler to install at any point along the length of the pipe than the prior art devices.

Another object of the present device is to provide an improved pipe support for supporting an underground carrier pipe which maintains the carrier pipe in a centered position within the outer encasement of a horizontally bored hole whenever the carrier pipe is rotated within the encasement.

Another object of the present invention is to provide an improved method of installing such a pipe support at any point along the length of an underground carrier pipe.

A further object of the invention is to provide a pipe support kit wherein the pipe clamps can be field assembled to accommodate carrier pipe and grade variations.

Yet another object of the invention is to provide a hinged pipe support for telescopic insertion into a carrier pipe wherein the hinge and clamp design accommodate varying pipe sizes, and dimensional and installation variations.

BRIEF DESCRIPTION OF DRAWINGS

The above and other objects and advantages of the present invention will become apparent upon reading the following detailed description taken in conjunction with the accompanying drawings in which.

DETAILED DESCRIPTION OF THE PREFERRED EMBODIMENT

Figure 1:
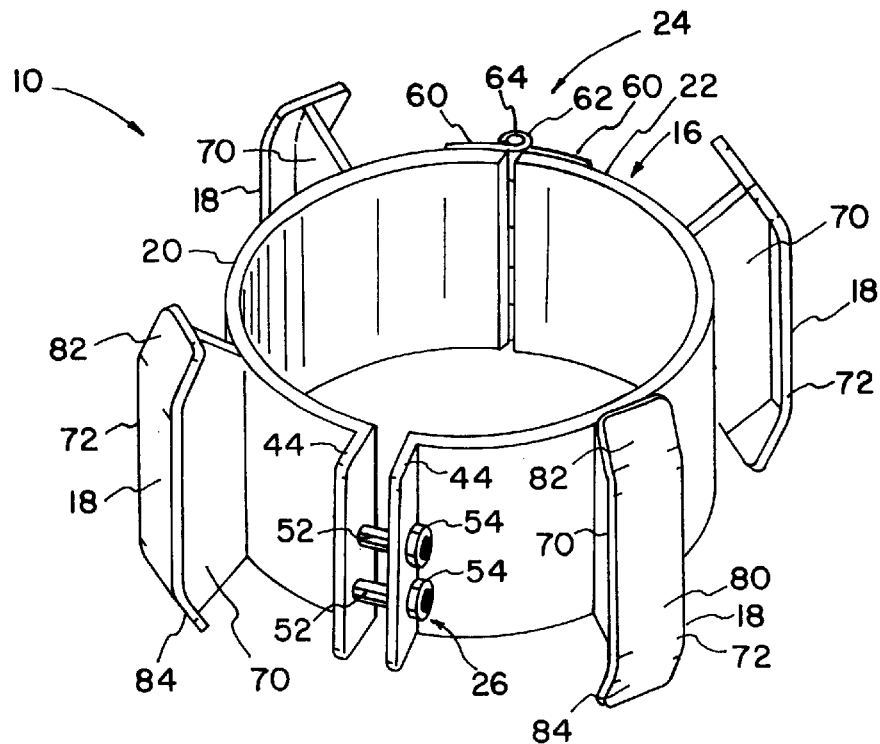
FIG. 1 is a perspective view of the improved pipe support of the present invention.
Figure 2:
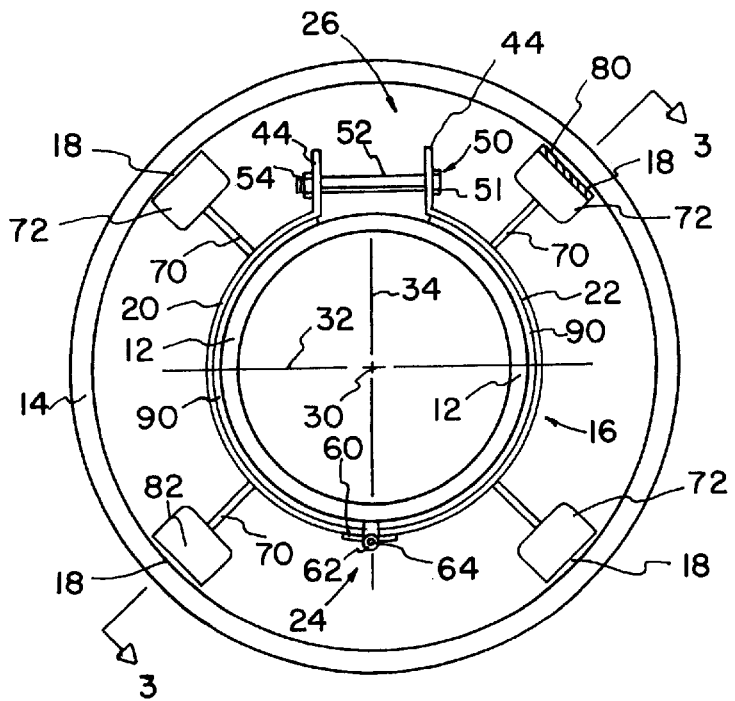
FIG. 2 is a cross-sectional view taken through the improved pipe support installed within the outer casing.
Figure 3:
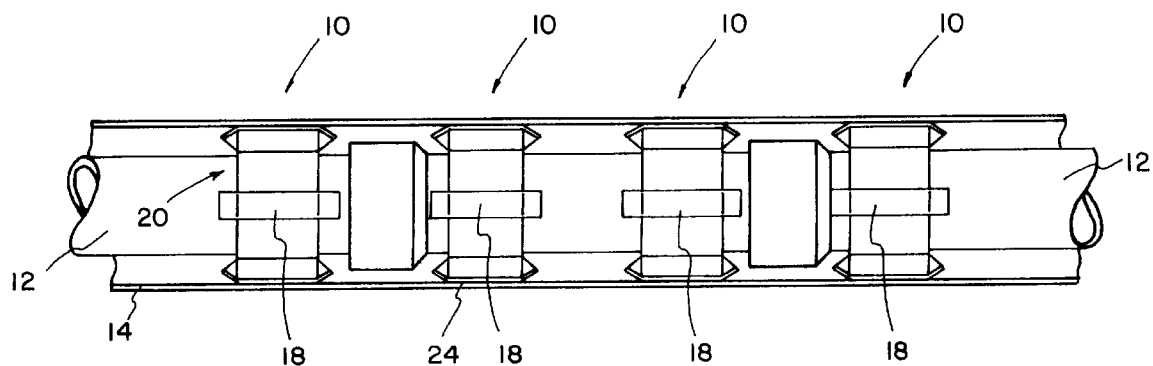
FIG. 3 is a side elevational view showing a plurality of the present pipe supports deployed within the encasement of a horizontally bored hole.

Referring to FIGS. 1 through 3 for purposes of illustrating a preferred embodiment of the invention and not for limiting same, there is shown a universal underground pipe support 10 for use in a conventional manner for supporting a carrier pipe 12 within an outer casing 14 in horizontal under ground traverses underneath roads, pavements, right-of ways and the like.

The pipe support 10 comprises an adjustable inner casing clamp assembly 16 for engaging, supporting an aligning a plurality of conduits, differing in size and material, and a plurality of radially outwardly extending, circumferentially spaced support legs 18 for guiding telescopic insertion into the outer casing 14, for supporting securely the carrier pipe 12 therewithin, and for accommodating grade variations in the installed outer casings to maintain the desired axial alignment of the carrier pipe therewithin.

The inner clamp assembly 12 comprises a pair of cylindrical clamp sections 20, 22 pivotally interconnected at one end by a butt type hinge 24 and adjustably fixedly interconnected at the other end by fasteners 26. The fasteners 26 are symmetrically disposed about a longitudinal axis 30 in a horizontal plane 32 and a vertical plane 34. In assembly, the hinge 24 lies at the lower end of the pipe support 10 and the fasteners 26 at the upper end thereof.

Figure 4:
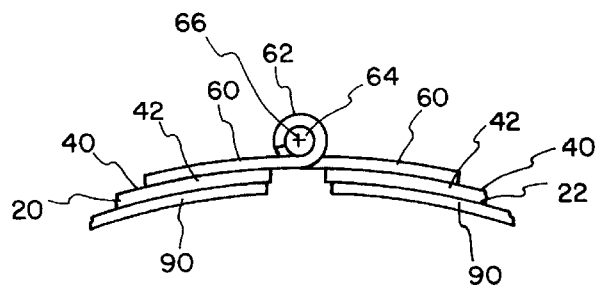
FIG. 4 is an enlarged fragmentary cross section view of the hinge of the pipe support illustrated in FIG. 2.

The sections 20, 22 are right-cylindrical having a nominal radius for the design diameter of a particularly identified carrier pipe, and having expansion and contraction capabilities through the hinge 24 and the fasteners 26 for handling conduits of larger and smaller diameters. The end section 40 of each section includes a planar portion 42 as illustrated in FIG. 4. In the typical rolling process for forming the sections, such planar portion remains straight and provides an improved substrate for perimeter welding of the hinge 24 to the ends as described in greater detail below. The other end of the clamp sections 20, 22 terminate with an outwardly turned flange 44. The flanges 44 include a pair of longitudinally spaced through holes, not shown, for receiving and securing the fasteners 26.

In nominal assembly, each clamp section 20, 22 spans a sector substantially less than 180° for handling various design conditions. In this respect, the flanges 44 as shown in FIG. 2 are equally spaced on either side of the vertical plane 34 and in planes parallel thereto. The other ends at the hinge 24 are likewise symmetrically spaced on either side of the vertical plane 34. Accordingly, it will be appreciated that the clamp assembly can be adjusted through the fasteners to provide a reduced nominal diameter or an increased diameter without binding or deformation at the hinge, as would result if the planar portions at the hinge abutted. In this connection, it has been found that a sector in the range of 130° to 175°, preferably 160° to 170° and a hinge spacing of about 0.1 to 0.8 inches accommodates the family of conduit/casing relationships most commonly encountered in the field.

The fastener 26 including typically a machine bolts 50 having a hexagonal head 51 engaging one flange, a threaded shank 52 extending through the holes in the flange, and a locknut 54 threaded to the shank 52 and engaging the outer surface of the other flange thereby securing the pipe support 10 in position about the carrier pipe 12. In the preferred embodiment the clamp sections 20 and 22 are fabricated from formed steel such as A36/A structural steel or other material suitable for this purpose.

The opposite planar ends of each clamp section 20 and 22 are pivotally connected by the butt hinge 24. The hinge 25 is conventional in construction and includes a pair of spaced hinge plates 60 interleaved cylindrical hinge sleeves 62 supporting a cylindrical hinge pin 64 for relative movement of the plates 60 about a lower longitudinal axis 66 parallel to and vertically spaced below the longitudinal axis 30. The plates 60 are flush mounted on the planar end surfaces 42 and perimeter welded thereto, preferably continuous Mig welds. The spacing between the ends 42 is about the diameter of the hinge pin 64 to allow pivoting without binding for smaller than nominal diameter carrier pipes.

In the embodiment shown in FIG. 1, the pipe support 10 includes four radially extending support legs 18. The legs 18 are also fabricated from A36/A structural steel. The support legs 18 include a radially extending base 70 and a skid plate 72 at the outer end thereof and transverse thereto. The base 70 is generally hexagonal and continuous at the inner end with the clamp sections, and continuous with the skid plate 72 at the outer end. The height or radial extent of the base 70 can be varied as discussed in greater detail below to handle varying design conditions to a length which is coextensive with the axial length of the clamp sections 20 and 22. The inner end of the base is continuously welded on both sides to the outer side of the cylindrical sections by weldments as discussed above.

A skid plate 72 is also constructed of A36/A structural steel is fixedly attached to the outer edge of the base 70 by weldments. The skid plate has a base section 80 parallel to the axis 30 and inwardly tuned front end 82 and rear end 84 converging toward the axis 30. The ends 82, 84 facilitate insertion of the carrier pipe or carrier pipe 12 into the casing 14 of a horizontally bored hole of the type bored underneath highway, railroad beds or other right-of way in order to accommodate a water, sewer, gas, telecommunication, chemical or air line through the encasement. Generally, it is preferred to orient the angle of the ends in the range of about 10° to 60°, preferably 25° to 45°, for convenient insertion. The outer end of the base section 80 is complementary to the cross section of the skid plate 72 to provide reinforcement to the ends 82, 84 thereby preventing deflection or deformation thereof during installation. In the preferred embodiment, the ends of the skid plate are bent at approximately 45° to axis 30. However, different configurations may be devised and are considered to be within the scope of the present invention. Thus, the embodiment shown is intended to be merely illustrative and not restrictive in any sense.

Referring now to FIG. 3 it can be seen that each leg 18 is disposed in parallel relation to the longitudinal axis 30 of the pipe support 10 extending to a length slightly greater than the axial length of each pipe support 10. This longer length of skid surface provides added stability and support for the carrier pipe 12 within the casing 14 of an underground bore.

The pipe support 10 may be constructed to accommodate various diameters of carrier pipe 12 having support legs 18 of different dimensions because the size of pipe support 10 is, of course, determined by the inner diameter of the casing 14 and the outer diameter of the carrier pipe 12 to be inserted and supported therein.

After construction is complete the structural steel components are cleaned, primed, and finished coated with a polyester urethane anti-corrosive paint.

In an installation procedure of the present device, a neoprene rubber liner 90 manufactured in accordance with industry specifications is adhesively secured to the interior surfaces of each clamp section. The liner 90 is designed to electrically insulate the carrier pipe 14 from the casing 16 and, more particularly, to provide diaelectric protection to the carrier pipe 12 or other conduit from static charges that may occur in the area around the underground casing 16.

Next, the pipe support 10 is installed in position about the carrier pipe 14. A significant advantage to the present invention is that the pipe support 10 can be installed about the carrier pipe 12 in an open clamshell condition thereof with the clamp sections 20 and 22 pivoted apart at any location along the length of the carrier pipe. In contrast, the prior art devices such as that disclosed in U.S. Pat. No. 4,896,701 comprised of a unitary collar and lacking the hinge feature of the present invention must be slipped on the male end and slidingly traversed along the entire length of the carrier pipe to the female end thereof before it can be installed and secured in position.

Once the desired number of pipe supports 10 are secured to the carrier pipe 12 it may be placed into the casing 14, in the horizontally bored hole. Of course, it is preferable that when placed within the casing 14 the skid plates will be in contact with or in close proximity to the inside surface of the casing 14 providing for optimum stability in support of the carrier pipe 12 therein. This requires that the pipe support 10 is constructed to standard dimensions which will assure that the pipe support will snugly engage the inner surface carrier pipe 12 when the fasteners 26 are tightened, and that the legs will position the skid plates in close proximity or into sliding contact with the inner surface of the casing 14.

Figure 5:
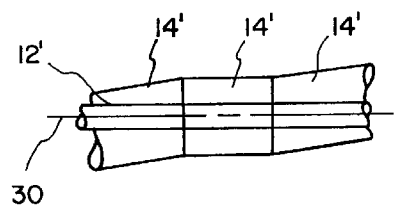
FIG. 5 is a schematic longitudinal cross sectional view of a carrier pipe installation illustrating design conditions accommodated by the support pipe of the present invention.
Figure 6:
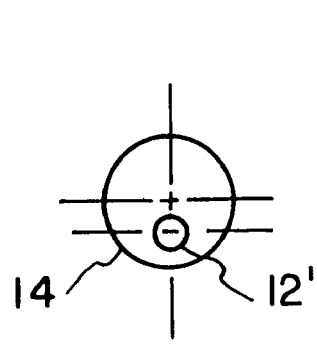
FIGS. 6 through 8 are schematic cross sectional views of pipe support adaptations for the carrier pipe design condition illustrated in FIG. 5.
Figure 7:
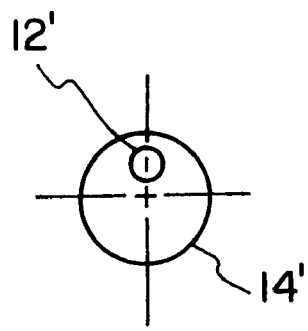
Figure 8:
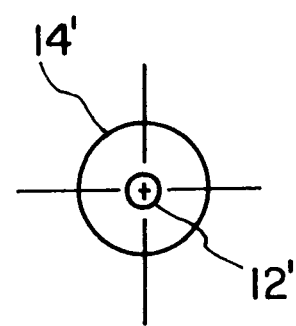
Figure 9:
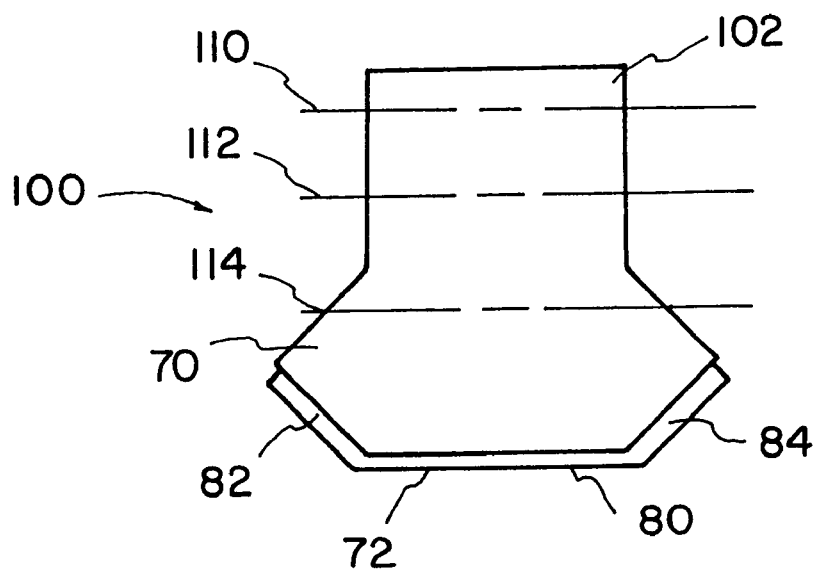
FIG. 9 is a side elevational view of a support leg for field modification.

Under field installation conditions, the outer casing 14 may be assembled with axial variations therealong, intended or unintended, whereas the carrier pipe may require a controlled axial alignment, for proper pitch and the like. Shown schematically in exaggerated form in FIG. 5 with similar components superscripted, the casings may be assembled below, at or above the desired axial alignment of the inner carrier pipe. According, in the present invention, the length of the bases 80 can be selectively revised based on field dimensions for the normal condition shown in FIG. 8, the inverted conditions shown in FIG. 7 or the restrained condition shown in FIG. 6. Further, horizontal variations may be handled in a corresponding manner. Where such conditions and requirements are known in advance, the pipe support 10 may be furnished to satisfy prevailing conditions. Oftentimes, however, such conditions are encountered directly at the site. To accommodate such needs, the present invention may be furnished in kit form comprising the hinged inner clamp assembly and a plurality of oversize leg assemblies as shown in FIG. 9. The kit leg assembly includes an elongated transition arm 102 attached to the such that the leg assembly has a sufficient length to handle extreme misalignment or grade variations. The overall length of the kit leg should thus be greater than the difference in radii between the casing and the carrier pipe. The leg assembly may be field cut along the illustrative cut lines 110, 112, 114 to provide the required transverse profile for insertion and location within the installed casing. The adapted leg assembly is field welded to the sections 20, 22 to complete the unit.

In view of the above it can be seen that the present invention provides an improved pipe support for supporting an underground carrier pipe within an outer casing of a horizontally bored hole beneath a highway or railroad bed.

The present device provides an annular ring comprised of two semicircular clamp sections which are pivotally joined by a hinge extending therebetween to permit the pipe support to be pivotably opened and closed for convenient installation around the carrier pipe.

The terms "inner", "outer", "side" and so forth have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. A pipe support device having a longitudinal axis for supporting an underground carrier pipe within a cylindrical casing of a horizontally bored hole comprising:

a pair of cylindrical clamp sections, each having a first end and a second end and spanning an included angle of around 140° to 175° with respect to said axis, an outwardly turned flange formed integral with said first end of each clamp section and transverse thereto, said second end of each clamp section terminating in a planar section;

a hinge assembly including a pair of planar hinge plates pivotally connected by a hinge pin, each hinge plate positioned against a planar section on said first end of said clamp section and perimeter welded thereto such that said second ends are circumferentially spaced at a gap adjacent said hinge pin and said flanges are circumferentially spaced on opposed sides of said axis;

radially projecting leg members attached at inner ends to said clamp sections at spaced-intervals about a circumference thereof, each of said leg members having an outer end radially outwardly terminating in skidding means to facilitate insertion of said carrier pipe within said casing; and an insulating liner adhesively connected to and covering an inner surface of each of said clamp sections to provide diaelectric protection to said carrier pipe from static electrical charges.

2. The pipe support device of claim 1 wherein said insulating liner is fabricated from neoprene rubber.

3. The pipe support device of claim 1 wherein said skidding means includes a skid member attached to said outer end of said leg member in parallel relation to said longitudinal axis.

4. The pipe support device of claim 3 wherein each of said skid members has a longitudinal length greater than a longitudinal length of said clamp sections to provide enhanced stability to said carrier pipe.

5. The pipe support device of claim 4 wherein each of said skid members includes integrally formed ends inwardly inclined with respect to said axis to facilitate insertion of said carrier pipe with said pipe support device attached into said casing and wherein the outer ends of said leg members are formed complementary to said skid members and said ends thereof to provide continuous reinforcement thereto during insertion into the casing.

6. The pipe support device of claim 5 wherein said formed ends are inclined at 45° to said axis.

7. The pipe support device of claim 1 wherein said entire device is coated with a polyester urethane anti-corrosive paint.

8. The pipe support device as recited in claim 1 wherein said gap is about the width of said hinge pin.

9. A pipe support kit for telescopically supporting and inserting a cylindrical carrier pipe into a cylindrical casing wherein the axis of the carrier pipe and the axis of the casing need to bear a predetermined relationship at installation, said kit comprising: a split cylindrical clamp comprising a pair of cylindrical pivotally connected clamping members including fastening means for securing said clamping members to said carrier pipe; a plurality of support members, each support member having an inner end and an outer end, said outer end being engagable with the inner surface of said casing, said support members having a length between said outer end and said inner end greater than the difference between the radius of the casing and the radius of the carrier pipe whereby said length may be severed in the field and circumferentially attached to said clamping members to provide an assembly wherein said support members orient said carrier pipe within said casing at said predetermined relationship.

10. The pipe support kit as recited in claim 9 wherein said clamping members are spaced at said pivotal connection and an insulating liner is adhesively connected to the interior surface of each clamp member.

* * * * *